United States Patent Office.

SAMUEL H. JONES, OF SANDY SPRING, MARYLAND, ASSIGNOR TO HIMSELF AND CHARLES W. BREADY, OF SAME PLACE.

Letters Patent No. 67,880, dated August 20, 1867.

IMPROVED CEMENT FOR LINING OIL-BARRELS.

The Schedule referred to in these Letters Patent and making part of the same.

TO ALL WHOM IT MAY CONCERN:

Be it known that I, SAMUEL H. JONES, of Sandy Spring, Montgomery county, State of Maryland, have invented an Improved Cement for Oil-Barrels, which I style the "Oil-Proof Cement;" and I do hereby declare the following to be an exact description of the mixture, as follows:

I use common glue, chalk, alcohol, turpentine, and water, mixed in the following proportions, to wit: one pound of glue, one fourth of a pound of chalk, one half pint of alcohol, one half gill of turpentine, one half pint of water, mixed well together, and then poured into a barrel made to contain oil. The mixture is shaken in the barrel, and the above quantity of ingredients is sufficient to coat one barrel of forty gallons in size. In a few days the barrel is ready coated and cemented to receive the petroleum or other oils.

What I claim as my invention, and desire to secure by Letters Patent, is—

The mixture and cement of glue, chalk, alcohol, turpentine, and water, in their several proportions as herein described and for the purposes set forth.

SAML. H. JONES.

Witnesses:
    J. FRANKLIN REIGART,
    EDM. F. BROWN.